(12) United States Patent
Okuma et al.

(10) Patent No.: US 11,072,267 B2
(45) Date of Patent: Jul. 27, 2021

(54) VEHICLE SEAT

(71) Applicants: TS TECH CO., LTD., Asaka (JP); HONDA MOTOR CO., LTD., Tokyo (JP)

(72) Inventors: Kei Okuma, Shioya-gun (JP); Koichi Suemitsu, Shioya-gun (JP); Kento Ota, Wako (JP); Shingo Baba, Wako (JP)

(73) Assignees: TS TECH CO., LTD., Asaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/495,684

(22) PCT Filed: Mar. 16, 2018

(86) PCT No.: PCT/JP2018/010368
§ 371 (c)(1),
(2) Date: Sep. 19, 2019

(87) PCT Pub. No.: WO2018/173938
PCT Pub. Date: Sep. 27, 2018

(65) Prior Publication Data
US 2020/0070697 A1    Mar. 5, 2020

(30) Foreign Application Priority Data

Mar. 23, 2017 (JP) .............................. JP2017-056955

(51) Int. Cl.
*B60N 2/68* (2006.01)
*B60N 2/23* (2006.01)
(Continued)

(52) U.S. Cl.
CPC ........... *B60N 2/682* (2013.01); *B60N 2/5678* (2013.01); *B60N 2/64* (2013.01); *B60N 2/90* (2018.02); *B60N 2/72* (2013.01)

(58) Field of Classification Search
CPC .......... B60N 2/90; B60N 2/5678; B60N 2/68; B60N 2/682; B60N 2/64; B60N 2/72
See application file for complete search history.

(56) References Cited

U.S. PATENT DOCUMENTS

| 5,292,178 A | 3/1994 | Loose et al. |
| 9,937,871 B2 * | 4/2018 | Fukatsu ................... B60N 2/70 |

(Continued)

FOREIGN PATENT DOCUMENTS

| JP | 2010-040186 A | 2/2010 |
| JP | 2011-116309 A | 6/2011 |

(Continued)

OTHER PUBLICATIONS

Jun. 12, 2018 International Search Report issued in International Patent Application No. PCT/JP2018/010368.

(Continued)

*Primary Examiner* — Shin H Kim
(74) *Attorney, Agent, or Firm* — Oliff PLC

(57) ABSTRACT

A vehicle seat including: a seat cushion on which a passenger is able to be seated; a seat back that is attached to a rear end of the seat cushion; and an electric component that is provided to at least one of the seat cushion and the seat back, wherein a fastening member is provided to the rear end of the seat cushion or a lower end of the seat back, an electric wire for supplying an electric power to the electric component is fastened to the rear end of the seat cushion or the lower end of the seat back by the fastening member, and one of the seat cushion and the seat back to which the fastening member is provided includes a contact regulation portion that is located behind the fastening member.

9 Claims, 5 Drawing Sheets

(51) Int. Cl.
  *B60N 2/02*  (2006.01)
  *B60N 2/56*  (2006.01)
  *B60N 2/90*  (2018.01)
  *B60N 2/64*  (2006.01)
  *B60N 2/72*  (2006.01)

(56) References Cited

U.S. PATENT DOCUMENTS

| | | |
|---|---|---|
| 2013/0193734 A1 | 8/2013 | Pleskot |
| 2016/0152191 A1* | 6/2016 | Fukatsu ............... B60N 2/75 297/188.04 |
| 2016/0280109 A1 | 9/2016 | Ito |
| 2017/0320417 A1 | 11/2017 | Ito |

FOREIGN PATENT DOCUMENTS

| | | |
|---|---|---|
| JP | 2013-220672 A | 10/2013 |
| JP | 2016-94100 A | 5/2016 |
| WO | 2014-077346 A1 | 5/2014 |

OTHER PUBLICATIONS

Sep. 24, 2019 International Preliminary Report on Patentability issued in International Patent Application No. PCT/JP2018/010368.

* cited by examiner

VEHICLE SEAT

TECHNICAL FIELD

The present invention relates to a vehicle seat including an electric component in a seat cushion or a seat back.

BACKGROUND ART

There has been conventionally known a vehicle seat which includes an electric component such as a heater, among vehicle seats each of which includes a seat cushion supporting the buttocks of a passenger and a seat back provided at the rear end of the seat cushion (see Patent Document 1).

In general, such an electric component is connected to an electric wire forming a wire harness arranged in the vehicle and receives supply of the electric power from a battery mounted on the vehicle.

In a case where the electric component is provided in the seat back, the electric wire connected to the electric component passes through the connected portion between the rear end of the seat cushion and the lower end of the seat back in many cases.

Since many seat backs can be tilted forward and backward, in many seat backs including electric components, the electric wire is fixed at the lower end of the seat back or the like by a fastening member (clip or the like) in order to avoid defects that the connector comes off, the electric wire is damaged, and the electric wire is misaligned due to the repeated tilting of the seat back.

CITATION LIST

Patent Literature

Patent Document 1: JP 2010-040186A

SUMMARY OF INVENTION

Technical Problem

In recent years, an increasing number of rear seats of automobiles have had seat backs which can be laid forward to make the back surfaces horizontal. In such a rear seat, the connected portion between the seat cushion and the seat back is easily exposed greatly when the seat back is laid. If such a rear seat includes the electric component as described above, when the seat back is laid, the electric wire connected to the electric component and the fastening member which fastens the electric wire are exposed in some cases.

In such a state, when the baggage is loaded into a loading space behind the rear seat, for example, the baggage possibly strikes the fastening member to make the fastening member come off and generate the defects as mentioned above.

The present invention has been made in consideration of the above problems, and an object of the present invention is to prevent a fastening member for fastening an electric wire to a seat cushion or a seat back from easily coming off in a vehicle seat in which an electric component is provided in the seat cushion or the seat back and the electric wire connected to the electric component passes between the seat back and the seat cushion.

Solution to Problem

In order to solve the above problems, a first aspect of the invention is a vehicle seat including: a seat cushion on which a passenger is able to be seated; a seat back that is attached to a rear end of the seat cushion; and an electric component that is provided to at least one of the seat cushion and the seat back, in which a fastening member is provided to the rear end of the seat cushion or a lower end of the seat back, an electric wire for supplying an electric power to the electric component is fastened to the rear end of the seat cushion or the lower end of the seat back by the fastening member, and one of the seat cushion and the seat back to which the fastening member is provided includes a contact regulation portion that is located behind the fastening member.

A second aspect of the invention is the vehicle seat of the first aspect, in which the fastening member is a clip that is attached to the seat cushion or the seat back such that the clip is able to be attached to and detached from the seat cushion or the seat back.

A third aspect of the invention is the vehicle seat of the first aspect, in which, behind the fastening member, the contact regulation portion is provided to extend from one side to the other side in a direction orthogonal to a front and rear direction of the fastening member.

A fourth aspect of the invention is the vehicle seat of the first aspect, in which the contact regulation portion is formed of a wire material.

A fifth aspect of the invention is the vehicle seat of the fourth aspect, in which the seat cushion or the seat back includes a pair of supporting portions that are arrayed in a width direction of the seat cushion or the seat back, the contact regulation portion is provided to extend in a width direction of the seat back, and ends of the contact regulation portion are respectively supported by the pair of supporting portions, and the fastening member is located between the pair of supporting portions.

A sixth aspect of the invention is the vehicle seat of the fifth aspect, in which the fastening t ember is provided to the seat back, and the pair of supporting portions are attached to a front surface of a seat back frame that is a flat plate provided in substantially parallel with a surface contacting a back of the passenger inside the seat back.

A seventh aspect of the invention is the vehicle seat of the sixth aspect, in which the contact regulation portion is located on a front side with respect to a back surface of the seat back frame.

An eighth aspect of the invention is the vehicle seat of the seventh aspect, in which the fastening member includes an attachment portion that is attached to the seat back, and an electric wire holding portion that holds the electric wire, and the contact regulation portion is located on a rear side with respect to the attachment portion.

A ninth aspect of the invention is the vehicle seat of the seventh aspect, in which the contact regulation portion is located on a lower side with respect to an attachment portion of the fastening member in a state in which the seat back stands.

A tenth aspect of the invention is the vehicle seat of the first aspect, in which the vehicle seat is a rear seat of an automobile, and the seat back is able to be laid forward to make a surface that contacts a back of the passenger overlap with an upper surface of the seat cushion.

Advantageous Effects of Invention

According to the first aspect of the invention, the contact regulation portion regulates contact between the baggage or the like loaded into the vehicle and the fastening member, for example. That is, since transmitting of the shock by the baggage or the like to the fastening member is suppressed, it is possible to prevent the fastening member from easily coming off.

Especially, the aspect is more effective when the seat back can be laid forward and the fastening member is exposed.

Since the clip is a member which has been conventionally used for fastening the electric wire, according to the second aspect of the invention, it is not necessary to change the member to a special member which prevents the fastening member from easily coming off. Thus, it is possible to suppress the raise of the manufacturing cost of the vehicle seat.

According to the third aspect of the invention, the contact regulation portion is arranged to pass the fastening member horizontally or vertically when the contact regulation portion is seen from a rear side. Thus, it is possible to protect the fastening member over a wide range.

According to the fourth aspect of the invention, it is possible to easily provide the contact regulation portion by merely bending the wire material and joining the end of the wire material to the seat cushion or the seat back.

According to the fifth aspect of the invention, the contact regulation portion is supported at two positions by a pair of supporting portions. Thus, the contact regulation portion can protect the fastening member from a stronger shock.

Furthermore, since the supporting portions suppress the shock from the width direction of the seat back, it is possible to more prevent the fastening member from coming off.

According to the sixth aspect of the invention, the unevenness on the back surface side of the seat back is reduced for the amount of non-protrusion of the supporting portions toward the back surface side of the seat back. Thus, when the seat back is tilted forward to place the baggage on the back surface of the seat back, the contact regulation portion does not easily interfere with the loading, unloading, or the like of the baggage.

According to the seventh aspect of the invention, not only the supporting portions but also the contact regulation portion is prevented from protruding toward the pack surface side of the seat back. Thus, when the seat back is tilted forward to place the baggage on the back surface of the seat back, it is possible to further prevent the contact regulation portion from interfering with the loading, unloading, or the like of the baggage.

According to the eighth aspect of the invention, transmission of the shock to the attachment portion is suppressed. Thus, the fastening member is protected more easily.

According to the ninth aspect of the invention, when the seat back is tilted, the contact regulation portion is located behind and above the fastening member. Thus, the fastening member is protected more easily.

According to the tenth aspect of the invention, even if the fastening member becomes exposed, it is still possible to prevent the fastening member from easily coming off since the contact regulation portion functions further.

DESCRIPTION OF EMBODIMENTS

The present embodiment is described below with reference to the drawings. The embodiments below include various technical limitations preferable to implement the embodiment, however, the scope of the present invention is not limited by the embodiments below or the illustrated examples.

(Vehicle Seat)

Figure 1:
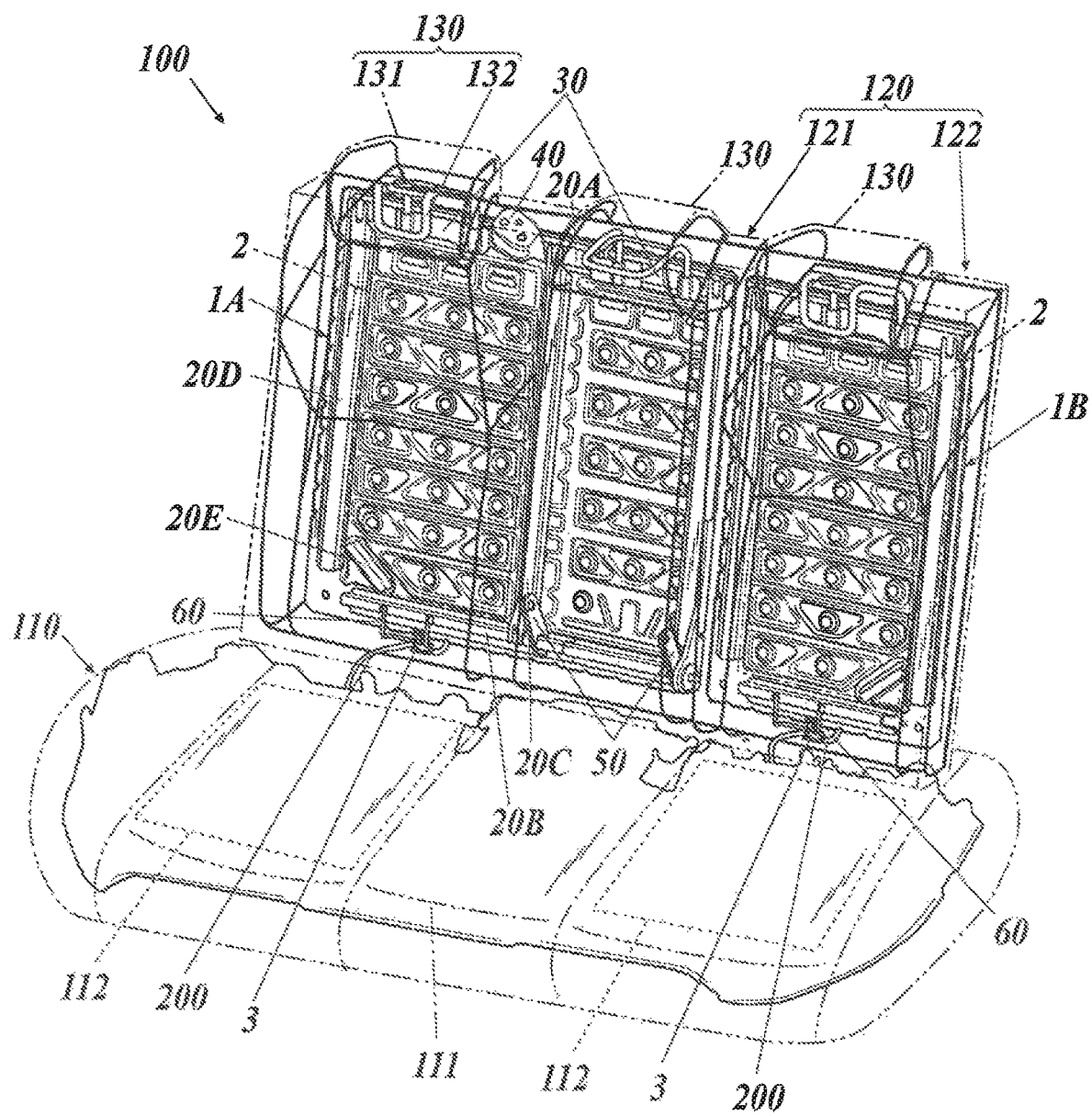
FIG. 1 is a perspective view of a vehicle seat according to an embodiment of the present invention.
Figure 1:
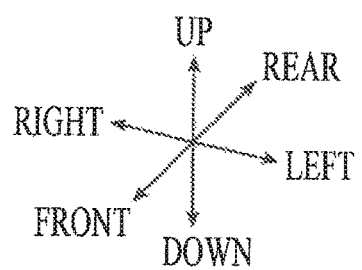
Figure 2:
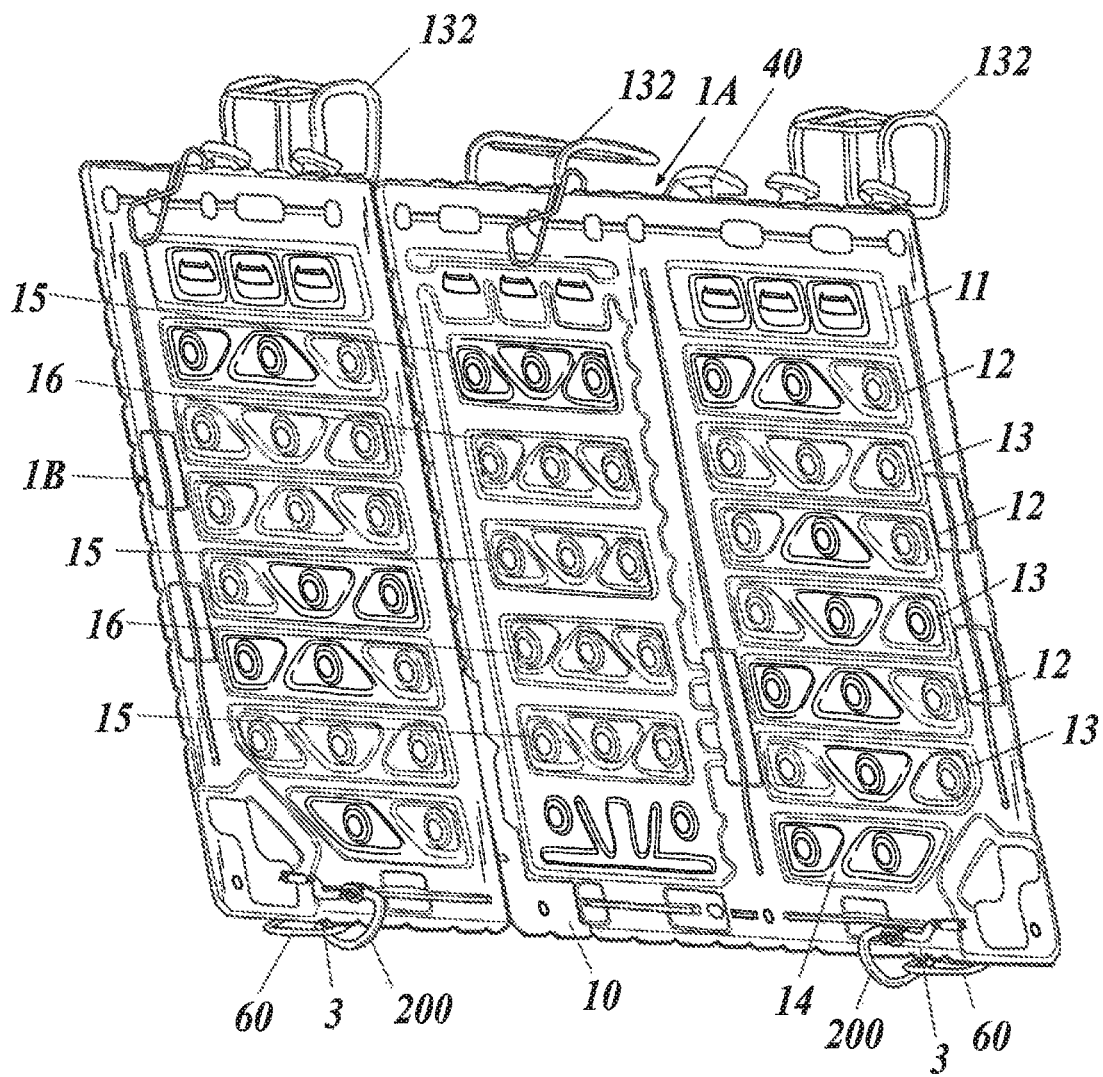
FIG. 2 is a perspective view of seat back frames (back surfaces) forming the vehicle seat in FIG. 1 and the peripheral structures.
Figure 2:
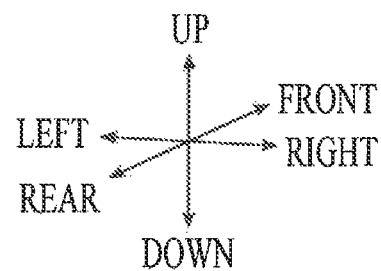

First, the schematic configuration of a vehicle seat 100 according to the embodiment will be described. FIG. 1 is a perspective view of the vehicle seat 100 (for explanation, a part of the configuration is shown to be transparent for convenience). FIG. 2 is a perspective view of seat back frames 1A, 1B (back surfaces) forming the vehicle seat 100 in FIG. 1.

In the description below, positions and directions are described as seen from a passenger seated in the vehicle seat, that according to the arrows of front, rear, left, right, up and down shown in the drawings.

As shown in FIG. 1, the vehicle seat 100 includes a seat cushion 110, a seat back 120, a plurality of head rests 130, an arm rest not shown in the drawings, and the like.

Though FIG. 1 shows a seat for a car, the present invention can also be applied to seats for other automobiles such as a bus and a truck.

Though FIG. 1 shows a rear seat for a plurality of passengers, the present invention can also be applied to a front seat for a single passenger.

The seat cushion 110 supports the buttocks of the passenger, and is attached to a floor of the space inside a car not shown in the drawings.

The seat cushion 110 includes a seat cushion frame 111, seat cushion electric components 112, a pad, an outer material, and the like.

Each of the seat cushion electric components 112 in the embodiment is a heater which warms the buttocks of the passenger, and is provided on the upper surface side of the first seat cushion frame 111 to spread in a plane parallel with the seat cushion frame 111. Though FIG. 1 shows a plurality of seat cushion electric components 112, a single seat cushion electric component 112 may be provided.

A connector not shown in the drawings is provided to the rear end of each of the seat cushion electric components 112 to connect the electric wire 200 forming the wire harness arranged in the vehicle.

The seat cushion electric component 112 operates by receiving the power supply from the electric wire 200, such as a seat belt reminder and a blower, for example. The seat cushion electric component 112 may be any component as long as it can be built in the seat cushion 110 or attached to the surface of the seat cushion 110.

The pad is formed by foaming a urethane resin into a shape of a sheet, and provided to the seat cushion frame 111 to wrap the first seat cushion frame 111 and the seat cushion electric components 112 from the front side of the seat cushion frame 111.

The outer material covers the seat cushion frame 111 and the pad.

The lower end (the end closer to the seat cushion 110) of the seat back 120 is supported by an axis rod which is provided to extend in the horizontal direction (car width direction) at the rear end of the seat cushion 110. The seat back 120 can be rotated around the axis rod as the center of rotation by releasing the lock not shown in the drawings. That is, the seat back 120 can stand as shown in FIG. 1, and can be laid such that the front surface (surface contacting the back of the passenger) overlaps with the upper surface (seat surface) of the seat cushion 110.

The seat back 120 is configured by including a first seat back 121 forming a central portion and a right side portion, and a second seat back 122 forming a left side portion. Each of them can be rotated independently.

The first seat back 121 includes a first seat back frame 1A, a seat back electric component 2, a fastening member 3, a pad, an outer material, and the like.

A pair of insertion holes not shown in the drawings for attaching the head rest 130 are formed on the upper portion of the right side portion of the first seat back 121.

A concave portion (not shown in the drawings) for containing the arm rest is formed on the left side portion of the first seat back 121 (central portion of the seat back 120), and a head rest 130 is provided above.

The first seat back frame 1A is a flat plate member which is a frame of the first seat back 121, and arranged substantially in parallel with the front surface (surface contacting the back of the passenger) of the first seat back 121, in the first seat back 121.

The details of the first seat back frame 1A will be described later.

The seat back electric component 2 in the embodiment is a heater which warms the back of the passenger, and provided on the front surface side of the first seat back frame 1A to spread in a plane parallel with the first seat back frame 1A.

A connector not shown in the drawings is provided to the lower end of the seat back electric component 2 to connect the electric wire 200 forming the wire harness arranged in the vehicle.

The seat back electric component 2 operates by receiving the power supply from the electric wire 200, similarly to the seat cushion electric component 112. The seat back electric component 2 may be any component as long as it can be built in the first seat back 121 or attached to the surface of the first seat back 121.

The fastening member 3 in the embodiment is attached to the lower end of the first seat back frame 1A.

The fastening member 3 holds the electric wire 200, and is attached to the first seat back frame 1A. Thereby, the fastening member 3 fastens the electric wire to the lower end of the first seat back frame 1A.

The details of the fastening member 3 will be described later.

The pad is formed by foaming a urethane resin into a shape of a sheet, and provided to the first seat back frame 1A to wrap the first seat back frame 1A and the seat back electric component 2 from the front side of the first seat back frame 1A.

The outer material covers the first seat back frame 1A and the pad.

The second seat back 122 includes a second seat back frame 1B, a seat back electric component 2, a fastening member 3, a pad, an outer material, and the like, similarly to the first seat back 121.

The second seat back 122 has a structure substantially similar to the structure which is horizontally symmetrical to only the right side portion in the first seat back 121. Thus, the explanation of the details of the second seat back 122 will be omitted.

Each of the head rests 130 includes a head rest main body 131 and a pair of pillars 132.

The head rest main body 131 includes a pad formed by foaming a urethane resin, and an outer material.

A pair of pillars 132 are members in a shape of rods, and protrude from the surface of the head rest main body 131 to extend in parallel having a same interval as the interval of the above-mentioned pair of insertion holes.

Each of the head rests 130 is attached to the seat back 120 by inserting the pair of pillars 132 into the respective insertion holes provided in the upper portion of the seat back 120. A stopper member not shown in the drawings is provided around each of the inlets of the insertion holes, and thus it is possible to stop the pillars 132 in a state in which the pillars 132 are inserted to a desired length (the head rest main body 131 is at a desired height).

The arm rest is a member formed in a cuboid. One end in the longitudinal direction of the arm rest is supported by an axis rod provided to extend in the horizontal direction in the lower portion of the concave portion of the seat back 120, and the arm rest can be rotated around the axis rod as the center of the rotation. That is, the arm rest can stand to be contained in the concave portion, and can be laid such that the other end in the longitudinal direction contacts the seat surface of the seat cushion 110.

(Seat Back Frame)

Next, the specific configuration of the first seat back frame 1A forming the first seat back 121 will be described.

As shown in FIGS. 1 and 2, the first seat back frame 1A includes a panel material 10, a plurality of frame materials 20A to 20E, head rest supporting portions 30, a seat belt guide member bracket 40, a pair of arm rest brackets 50, a fastening member protecting portion 60, and the like.

The panel material 10 is a metal such as a steel or an aluminum alloy and is formed to be in a substantially flat shape in a rectangular shape from a front view.

The peripheral of the panel material 10 is bent toward the front side (direction in which the surface requiring reinforcement is directed) over the substantially entire circumference. That is, the entire shape of the panel material 10 is a tray shape.

The plurality of frame materials 20A to 20E are members formed of metal such as a steel or an aluminum alloy in a shape of rods. All of the frame materials 20A to 20E are welded to the front surface of the panel material 10 (surface requiring reinforcement).

Among them, the upper frame material 20A is arranged in the upper end of the panel material 10 to extend along the upper edge of the panel material 10.

The lower frame material 20B is arranged in the lower end of the panel material 10 to extend along the lower edge of the panel material 10.

The middle frame material 20C is arranged through the central portion of the panel material 10, to extend in parallel with the lateral edges of the panel material 10.

The pair of lateral frame materials 20D are respectively arranged in the left and rig it lateral ends of the panel material 10 to extend along the lateral edges of the panel material 10.

The corner frame material 20E is arranged in the lower right portion of the panel material 10 to extend with an angle (approximately 45 degrees) with respect to the lower edge or the right edge of the panel material 10.

As shown in FIG. 2, in the right side portion and the central portion of the panel material 10, a plurality of reinforcement regions 11 to 16 for enhancing the stiffness of the panel material 10 are provided to be arrayed in the vertical direction. In detail, in the right side portion, the first reinforcement region 11 is provided upper most, the fourth reinforcement region 14 is provided lowermost, and the second reinforcement regions 12 and the third reinforcement regions 13 are provided to be alternately arrayed between the first reinforcement region 11 and the fourth reinforcement region 14.

In the central portion, the fifth reinforcement region 15 and the sixth reinforcement region 16 are provided to be alternately arrayed.

Each of the reinforcement regions 11 to 16 is formed of a plurality of reinforcement portions protruding, in a shape of lines along the front surface, from the front surface (surface requiring reinforcement). By forming grooves in the back surface of the panel material 10 by molding, the reinforcement portions in the embodiment are beads (projections) with the front surface of the panel material 10 bulging out in a shape of lines. Thus, the stiffness of the panel material 10 is enhanced, and the panel material 10 is not easily bent.

As shown in FIG. 1, the head rest holding portion 30 is provided on the front surface of the right side portion and the central portion in the upper frame material 20A. As shown in FIG. 1, the head rest holding portion 30 includes a joining portion which is a plate joined to the front surface of the upper frame material 20A, and a pair of pillar supporting portions which are cylinders with both ends open and provided to be hollow in a substantially vertical direction at both ends of the joining portion.

A cylindrical pillar holding member (not shown in the drawings) is inserted into each pillar supporting portion.

When a pair of pillars 132 of the head rest 130 are respectively inserted into a pair of insertion holes of the first seat back 121, the pillars 132 pass through the pillar holding members.

The seat belt guide member bracket 40 is welded to the lateral side of the head rest holding portion 30 in the upper frame material 20A.

A seat belt guide member (not shown in the drawings) formed of a resin, for example, is attached to the seat belt guide member bracket 40. A seat belt not shown in the drawings is inserted in the seat belt guide member.

The pair of arm rest brackets 50 is a member which supports the above-mentioned arm rest to be rotatable. The pair of arm rest brackets 50 is welded to the portions on the central portion side in the lower frame material 20B.

Both of the arm rest brackets 50 are provided to extend in parallel with each other, diagonally forward and upward with an interval of an approximately same degree as the width in the horizontal direction (short direction) of the above-mentioned arm rest.

The ends of the respective arm rest brackets 50 have axis holes for inserting the axis rod which supports the arm rest, the axis holes being formed to face each other.

The fastening member protecting portion 60 is a member for protecting the fastening member 3 which fastens the electric wire 200 arranged in the vehicle to the lower end of the first seat back frame 1A, and the fastening member protecting portion 60 is attached to the front surface of the first seat back frame 1A.

The details of the fastening member protecting portion 60 will be described later together with the details of the fastening member 3.

(Fastening Member and Fastening Member Protecting Portion)

Figure 3:
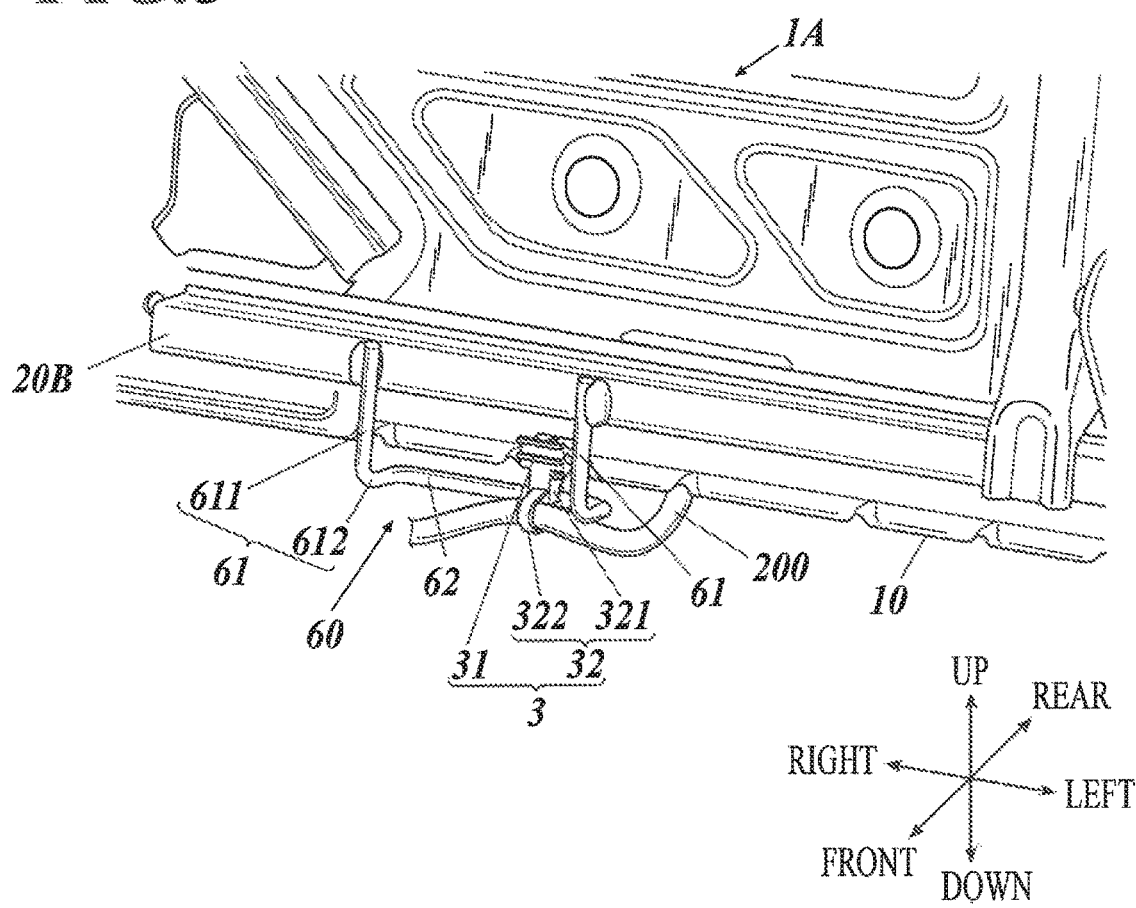
FIG. 3 is a perspective view enlarging a part of FIG. 1.

Next, the details of the fastening member protecting portion 60 provided to form the first seat back frame 1A and the fastening member 3 attached to the first seat back frame 1A will be described. FIG. 3 is a perspective view enlarging a part of FIG. 1, FIGS. 4 and 5 are perspective views enlarging a part of FIG. 2, and FIGS. 6A and 6B are schematic views of the vehicle seat (lateral surface) according to the embodiment.

Figure 4:
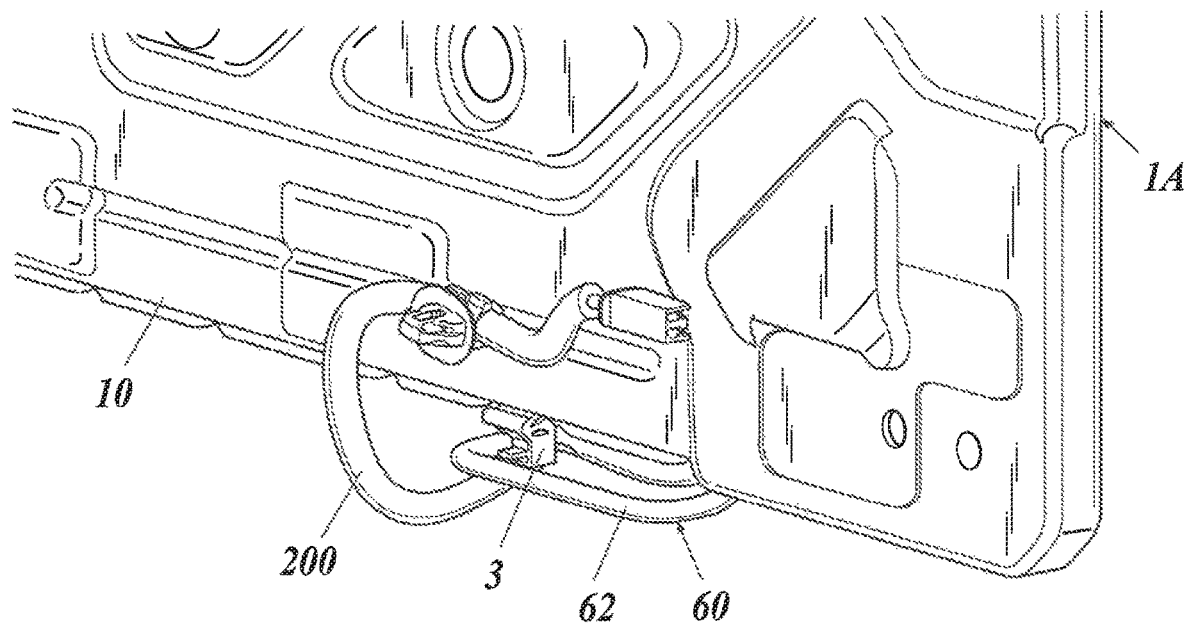
FIG. 4 is a perspective view enlarging a part of FIG. 2.
Figure 5:
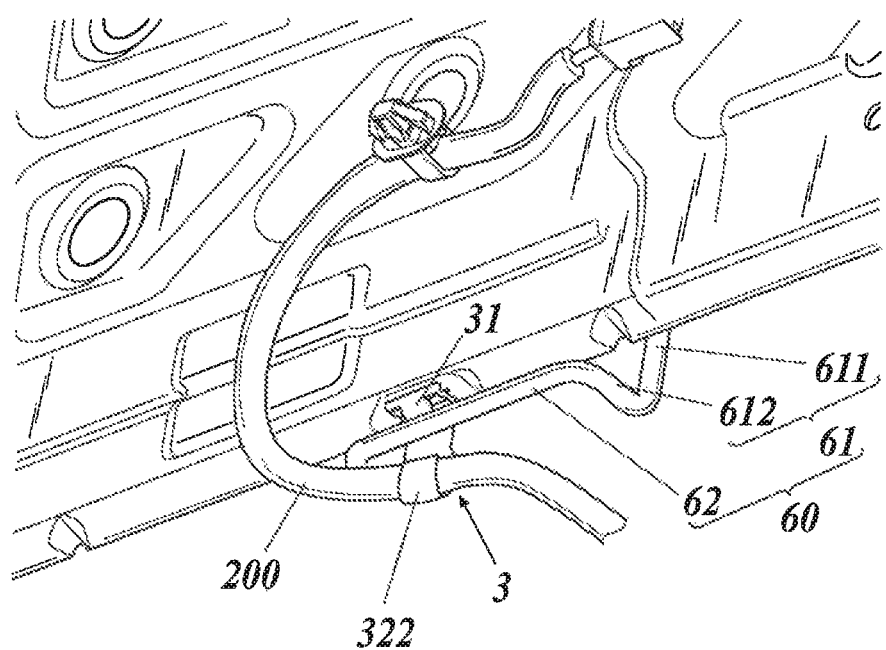
FIG. 5 is a perspective view enlarging a part of FIG. 2.
Figure 6A:
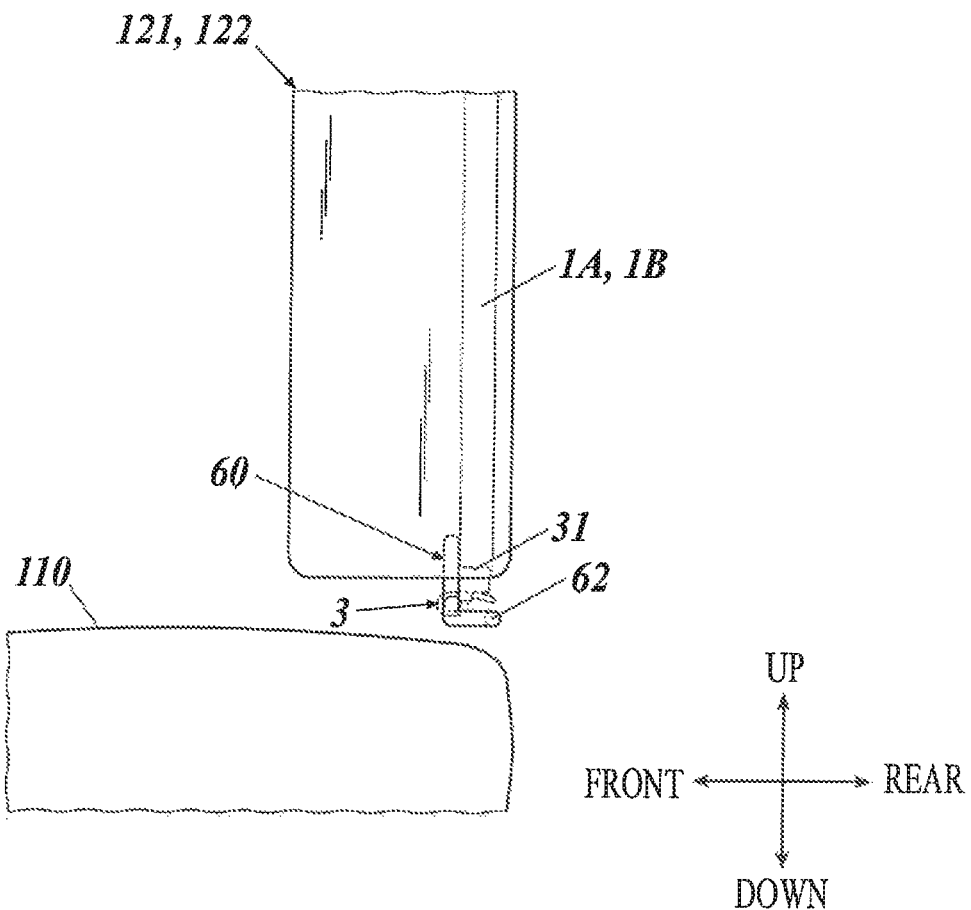
FIG. 6A is a schematic view of the vehicle seat (lateral surface) according to the embodiment.
Figure 6B:
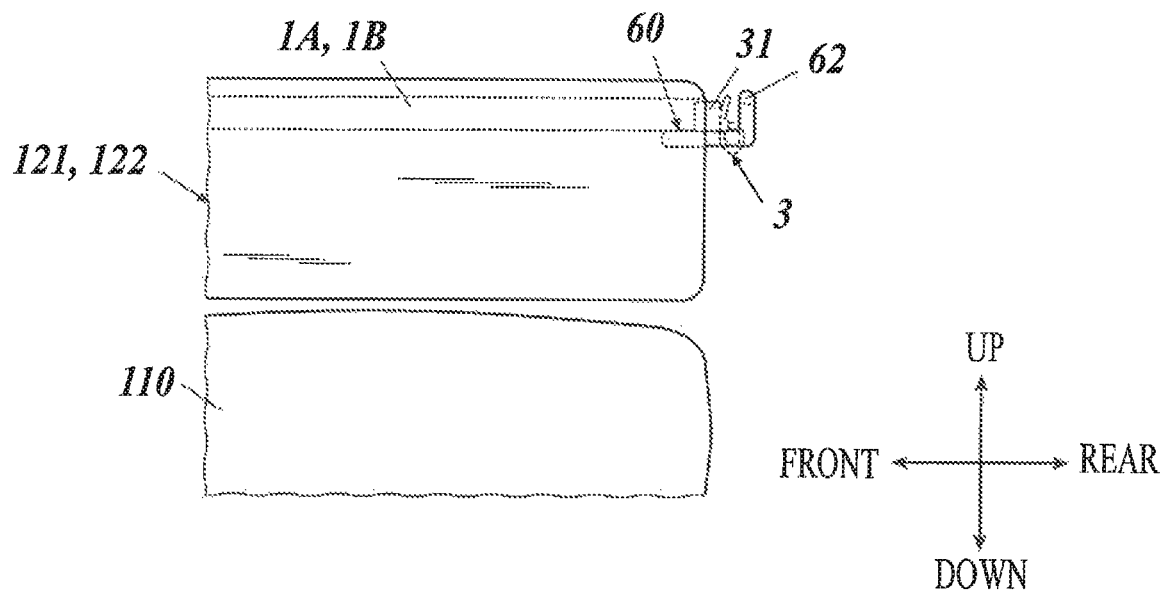
FIG. 6B is a schematic view of the vehicle seat (lateral surface) according to the embodiment.

As shown in FIGS. 3 to 5, the fastening member protecting portion 60 in the embodiment includes a pair of supporting portions 61 and a contact regulation portion 62.

The fastening member protecting portion 60 in the embodiment is formed by bending a wire material such as a wire. That is, the supporting portions 61 and the contact regulation portion 62 are integrated.

The pair of supporting portions 61 are arranged to be arrayed in the width direction of the first seat back frame 1A (first seat back 121), and each of the supporting portions 61 includes a hanging portion 611 and a backward extending portion 612.

The pair of hanging portions 611 is welded to the right side portion in the lower frame material 20B, and extends downward (direction of extending away from the head rest 130 and the upper frame material 20A) from the front surface of the lower frame material 20B (first seat back frame 1A) to a degree that the lower end (the end farther away from the panel material 10) is aligned with the lower end of the fastening member 3. The pair of hanging portions 611 extends in parallel with each other with a predetermined interval (distance longer than the length in the width direction of the fastening member 3).

The backward extending portions 612 extend backward (direction in which the back surface of the panel material 10 is directed) from the lower ends of respective hanging portions 611 to a degree that the rear ends do not extend beyond the back surface of the panel material 10 (degree of being aligned with the back surface at longest).

The contact regulation portion 62 is provided to extend in the width direction of the first seat back frame 1A, and both ends are connected to the rear ends of the respective backward extending portions 612. That is, both ends are supported by the pair of supporting portions 61.

As mentioned above, since the rear ends of the backward extending portions 612 do not extend beyond the back surface of the panel material 10, the rear end of the contact regulation portion 62 continuously extending from the rear ends of the backward extending portions 612 is located in the front side with respect to the back surface of the panel material 10.

The fastening member 3 is attached at the lower end of the first seat back frame 1A between the pair of supporting portions 61 in the fastening member protecting portion 60 configured as mentioned above.

The fastening member 3 includes an attachment portion 31 and an electric wire holding portion 32.

The attachment portion 31 is configured to be able to nip the portion which is bent forward in the lower end of the panel material 10. That is, the fastening member 3 in the embodiment is a clip, and can be attached to and detached from the first seat back frame 1A.

The electric wire holding portion 32 includes an insertion portion 321 below the attachment portion 31 and a band portion 322 which extends in a long and narrow shape from the insertion portion 321.

A ring is formed on the front side of the insertion portion by passing the tip of the band portion 322 from the front side through a hole which is formed in the insertion portion 321 and hollow in the front and rear direction. The electric wire 200 is held by passing the electric wire 200 through the ring.

In the embodiment, though the electric wire held by the electric wire holding portion is the wire harness arranged in the vehicle, the electric wire holding portion may hold electric wires of the electric components 2, 112 when the electric wires are extending from the electric components 2, 112.

In the fastening member 3 configured in such a way, the electric wire holding portion 32 is hanging downward from the portion which is bent forward in the lower end of the panel material 10, and located at least on the front side with respect to the back surface of the panel material 10.

On the other hand, since the above-mentioned contact regulation portion 62 is located around immediately below the back surface of the panel material 10, the fastening member 3 is located on the front side with respect to the contact regulation portion 62.

In the vehicle seat 100 in the embodiment configured in such a sway, in a state in Which the first seat back 121 stands, the contact regulation portion 62 of the fastening member protecting portion 60 is located on the rear side of the fastening member 3 and at a height of a same degree as the height of the lower end of the fastening member 3 (at least on the lower side with respect to the attachment portion 31 of the fastening member 3) as shown in FIG. 6A.

On the other hand, in a state in which the first seat back 121 is laid forward, the contact regulation portion 62 of the fastening member protecting portion 60 is located at a position aligned with the rear end of the fastening member 3 (at least on the rear side with respect to the attachment portion 31 of the fastening member 3) and above the fastening member 3 as shown in FIG. GB.

That the contact regulation portion 62 is located on the rear side of the fastening member in both of the above states of the first seat back 121.

As described above, in the vehicle seat 100 according to the embodiment, a fastening member 3 is provided to the lower end of the first seat back 121, an electric wire 200 for supplying an electric power to the electric component 2, 112 is fastened to the lower end of the first seat back 121 by the fastening member 3, and the first seat back 121 includes a contact regulation portion 62 that is located behind the fastening member 3.

Thus, the contact regulation portion 62 regulates contact between the baggage or the like loaded into the vehicle and the fastening member 3, for example. That is, since the transmitting of the shock by the baggage or the like to the fastening member 3 is suppressed, it is possible to prevent the fastening member 3 from easily coming off.

In the vehicle seat 100 according to the embodiment, the fastening member 3 is a clip that is attached to the first seat back 121 such that the clip is able to be attached to and detached from the first seat back 121.

The clip is a member which has been conventionally used for fastening the electric wire. Thus, by the above feature, it is not necessary to change the member to a special member for preventing the fastening member 3 from easily coming off, and it is possible to suppress the raise in the manufacturing cost of the vehicle seat 100.

In the vehicle seat 100 according to the embodiment, behind the fastening member 3, the contact regulation portion 62 is provided to extend from one side to the other side in a direction orthogonal to a front and rear direction of the fastening member 3.

Thus, the contact regulation portion 62 is arranged to pass the fastening member 3 horizontally or vertically when the contact regulation portion 62 is seen from a rear side. Thus, it is possible to protect the fastening member over a wide range.

In the vehicle seat 100 according to the embodiment, the contact regulation portion 62 is formed of a wire material.

Thus, it is possible to easily provide the contact regulation portion 62 by merely bending the wire material and joining the ends thereof to the first seat back 121.

In the vehicle seat 100 according to the embodiment, the first seat back 121 includes a pair of supporting portions 61 that are arrayed in a width direction of the first seat back 121, the contact regulation portion 62 is provided to extend in the width direction of the first seat back 121, and the ends of the contact regulation portion 62 are respectively supported by the pair of supporting portions 61, and the fastening member 3 is located between the pair of supporting portions 61.

Thus, since the contact regulation portion 62 is supported at two positions by a pair of supporting portions 61, the contact regulation portion 62 can protect the fastening member 3 from a stronger shock.

Furthermore, since the supporting portions 61 suppress the shock from the width direction of the first seat back 121, it is possible to more prevent the fastening member 3 from coming off.

In the vehicle seat 100 according to the embodiment, the fastening member 3 is provided to the first seat back 121, and the pair of supporting portions 61 are attached to a front surface of a first seat back frame 1A that is a flat plate provided in substantially parallel with a front surface (surface contacting aback of the passenger) inside the first seat back 121.

Thus, the unevenness on the back surface side of the first seat back 121 is reduced for the amount of non-protrusion of the supporting portions 61 toward the back surface side of the first seat back 121. Thus, when the first seat back 121 is tilted forward to place the baggage on the back surface of the first seat back 121, the contact regulation portion 62 does not easily interfere with the loading, unloading, or the like of the baggage.

In the vehicle seat 100 according to the embodiment, the contact regulation portion 62 is located on a front side with respect to a back surface of the first seat back frame 1A.

Thus, not only the supporting portions 61 but also the contact regulation portion 62 is prevented from protruding toward the back surface side of the first seat back 121. Thus, when the first seat back 121 is tilted forward to place the baggage on the back surface of the first seat back 121, it is possible to further prevent the contact regulation portion 62 from interfering with the loading, unloading, or the like of the baggage.

In the vehicle seat 100 according to the embodiment, the fastening member 3 includes an attachment portion 31 that is attached to the first seat back 121, and an electric wire holding portion 32 that holds the electric wire, and the contact regulation portion 62 is located on a rear side with respect to the attachment portion 31.

Thus, since transmission of the shock to the attachment portion 31 is suppressed, the fastening member 3 is protected more easily.

In the vehicle seat 100 according to the embodiment, the contact regulation portion 62 is located on a lower side with respect to an attachment portion 31 of the fastening member 3 in a state in which the first seat back 121 stands.

Thus, when the first seat back 121 is tilted, the contact regulation portion 62 is located behind and above the fastening member 3. Thus, the fastening member 3 is protected more easily.

The vehicle seat 100 according to the embodiment is a rear seat of an automobile, and the first seat back 121 is able to be laid forward to make the front surface overlap with an upper surface of the seat cushion 110.

Thus, even if the fastening member 3 is exposed, it is still possible to prevent the fastening member 3 from easily coming off since the contact regulation portion 62 further functions.

These effects can also be applied to the second seat back 122 for which the detailed explanation of the configuration is omitted.

Though the present invention has been specifically described on the basis of the embodiment, the present invention is not limited to the above embodiment, and modifications can be made within the scope of the invention.

For example, the embodiment has been described by taking, as an example, case where the fastening member 3 and the fastening member protecting portion 60 are provided to the seat back 120. However, the fastening member may be provided to the rear end of the seat cushion 110, or may be provided to both of the seat back 120 and the seat cushion 110. In such case, the contact regulation portion is provided to the seat cushion (for example, the rear end of the seat cushion frame).

In the embodiment, the vehicle seat 100 is a rear seat of the automobile. However, the vehicle seat 100 may be a front seat. In this case, it is possible to protect from the shock caused by a foot or the like of the passenger seated on the rear seat.

In the embodiment, the contact regulation portion 62 extends in the horizontal direction. However, the contact regulation portion 62 may extend in the height direction of the seat back 120. In this case, since the upper end of the contact regulation portion in a rod shape may be directly welded to the seat back frames 1A, 1B, the supporting portion is not necessary.

Furthermore, in the embodiment, the supporting portions 61 and the contact regulation portion 62 are integrally formed by a single wire material. However, each of the supporting portions 61 and the contact regulation portion 62 may be a separate member.

The embodiment has been described for, as an example, a case of providing electric components in both of the seat cushion 110 and the seat back 120. However, the electric component may be provided to only one of the seat cushion 110 and the seat back 120, and the electric component (s) in one or both of the seat cushion 110 and the seat back 120 may be other than the heater.

In the embodiment, the fastening member 3 is attached by nipping the lower ends of the seat back frames 1A, 1B. However, for example, the fastening member 3 may be attached by engaging with the unevenness of the seat back frames 1A, 1B, or may be attached by being bonded to the seat back frames 1A, 1B.

In the embodiment, the fastening member protecting portion 60 and the fastening member 3 are provided to each of the first seat back 121 and the second seat back 122. However, the fastening member protecting portion 60 and the fastening member 3 provided to only one of the seat backs to collectively fasten the electric wires of the seat back electric components 2 of the first seat back 121 and the second seat back 122.

In a case where the fastening member protecting portion 60 and the fastening member 3 are provided to only one point, the fastening member protecting portion 60 and the fastening member 3 may be provided to the lower end in the center of the seat back 120.

INDUSTRIAL APPLICABILITY

The present invention can be applied to a vehicle seat of an automobile or the like.

REFERENCE SIGNS LIST 100 vehicle seat
  110 seat cushion
    111 seat cushion frame
    112 seat cushion electric component
  120, 121, 122 seat back
    1A, 1B seat back frame
      10 panel material
        11-16 reinforcement region
      20A-20E frame material
      30 head rest holding portion
      40 seat belt guide member bracket
      50 arm rest bracket
      60 fastening member protecting portion
        61 supporting portion
          611 hanging portion
          612 backward extending portion
        62 contact regulation portion
    2 seat back electric component
    3 fastening member
      31 attachment portion
      32 electric wire holding portion
        321 insertion portion
        322 band portion
  130 head rest
    131 head rest main body
    132 pillar
200 electric wire

The invention claimed is:

1. A vehicle seat comprising:
a seat cushion on which a passenger is able to be seated;
a seat back that is attached to a rear end of the seat cushion; and
an electric component that is provided to at least one of the seat cushion and the seat back, wherein
a fastening member is provided to the rear end of the seat cushion or a lower end of the seat back,
an electric wire for supplying an electric power to the electric component is fastened to the rear end of the seat cushion or the lower end of the seat back by the fastening member, and
one of the seat cushion and the seat back to which the fastening member is provided includes a contact regulation portion that is located behind the fastening member,
wherein the contact regulation portion is formed of a wire material.

2. The vehicle seat according to claim 1, wherein the fastening member is a clip that is attached to the seat cushion or the seat back such that the clip is able to be attached to and detached from the seat cushion or the seat back.

3. The vehicle seat according to claim 1, wherein, behind the fastening member, the contact regulation portion is provided to extend from one side to the other side in a direction orthogonal to a front and rear direction of the fastening member.

4. The vehicle seat according to claim 1, wherein
the seat cushion or the seat back includes a pair of supporting portions that are arrayed in a width direction of the seat cushion or the seat back, the contact regulation portion is provided to extend in a width direction of the seat back, and ends of the contact regulation portion are respectively supported by the pair of supporting portions, and the fastening member is located between the pair of supporting portions.

5. The vehicle seat according to claim 4, wherein the fastening member is provided to the seat back, and the pair of supporting portions are attached to a front surface of a seat back frame that is a flat plate provided in substantially parallel with a surface contacting a back of the passenger inside the seat back.

6. The vehicle seat according to claim 5, wherein the contact regulation portion is located on a front side with respect to a back surface of the seat back frame.

7. The vehicle seat according to claim 6, wherein the fastening member includes an attachment portion that is attached to the seat back, and an electric wire holding portion that holds the electric wire, and the contact regulation portion is located on a rear side with respect to the attachment portion.

8. The vehicle seat according to claim 6, wherein the contact regulation portion is located on a lower side with respect to an attachment portion of the fastening member in a state in which the seat back stands.

9. The vehicle seat according to claim 1, wherein the vehicle seat is a rear seat of an automobile, and the seat back is able to be laid forward to make a surface that contacts a back of the passenger overlap with an upper surface of the seat cushion.

\* \* \* \* \*